June 15, 1937. W. H. BASELT 2,084,071
UNIT CYLINDER CLASP BRAKE
Filed Aug. 31, 1936 2 Sheets-Sheet 1
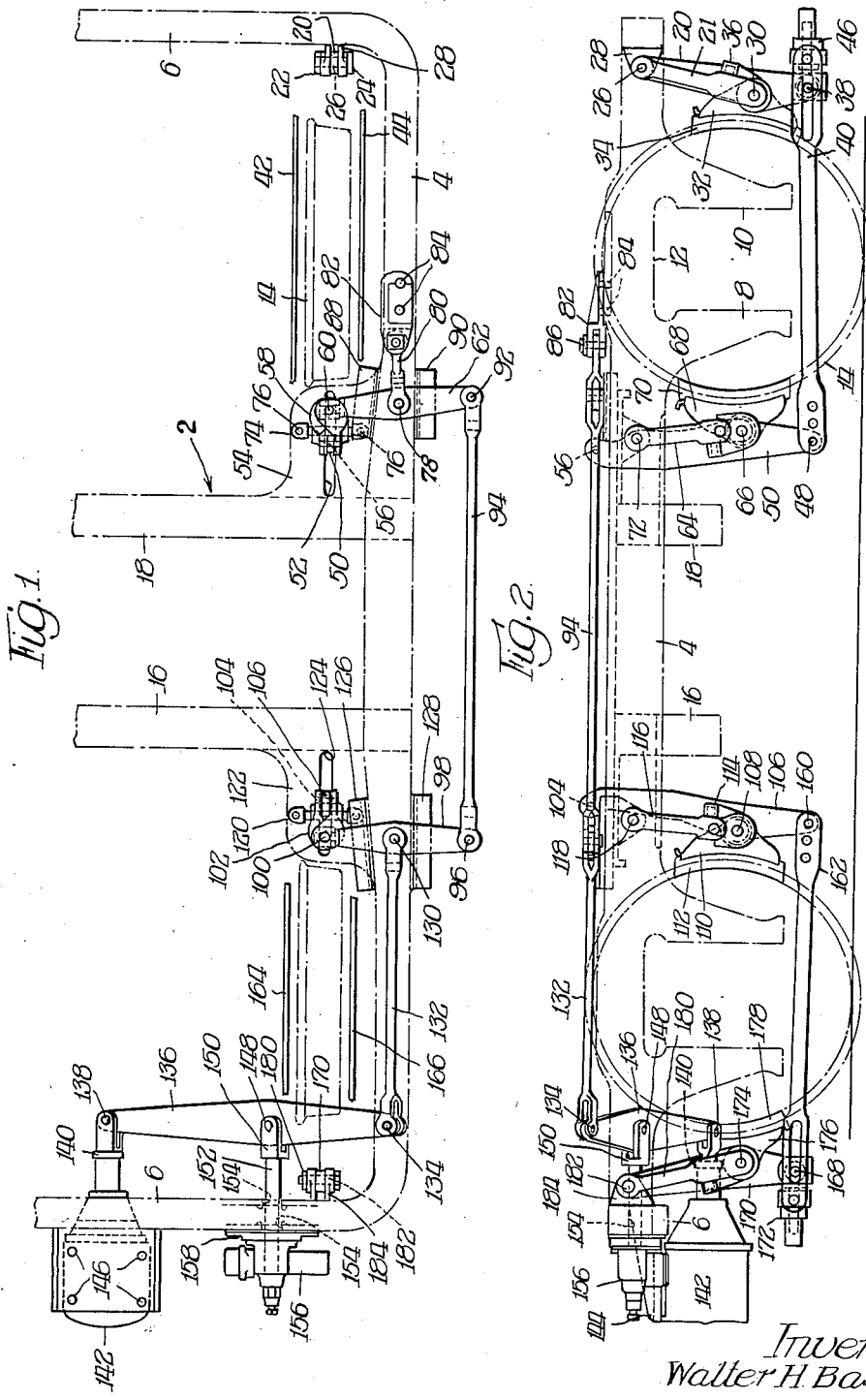
Inventor:
Walter H. Baselt,
By Orin O.B. Garner atty

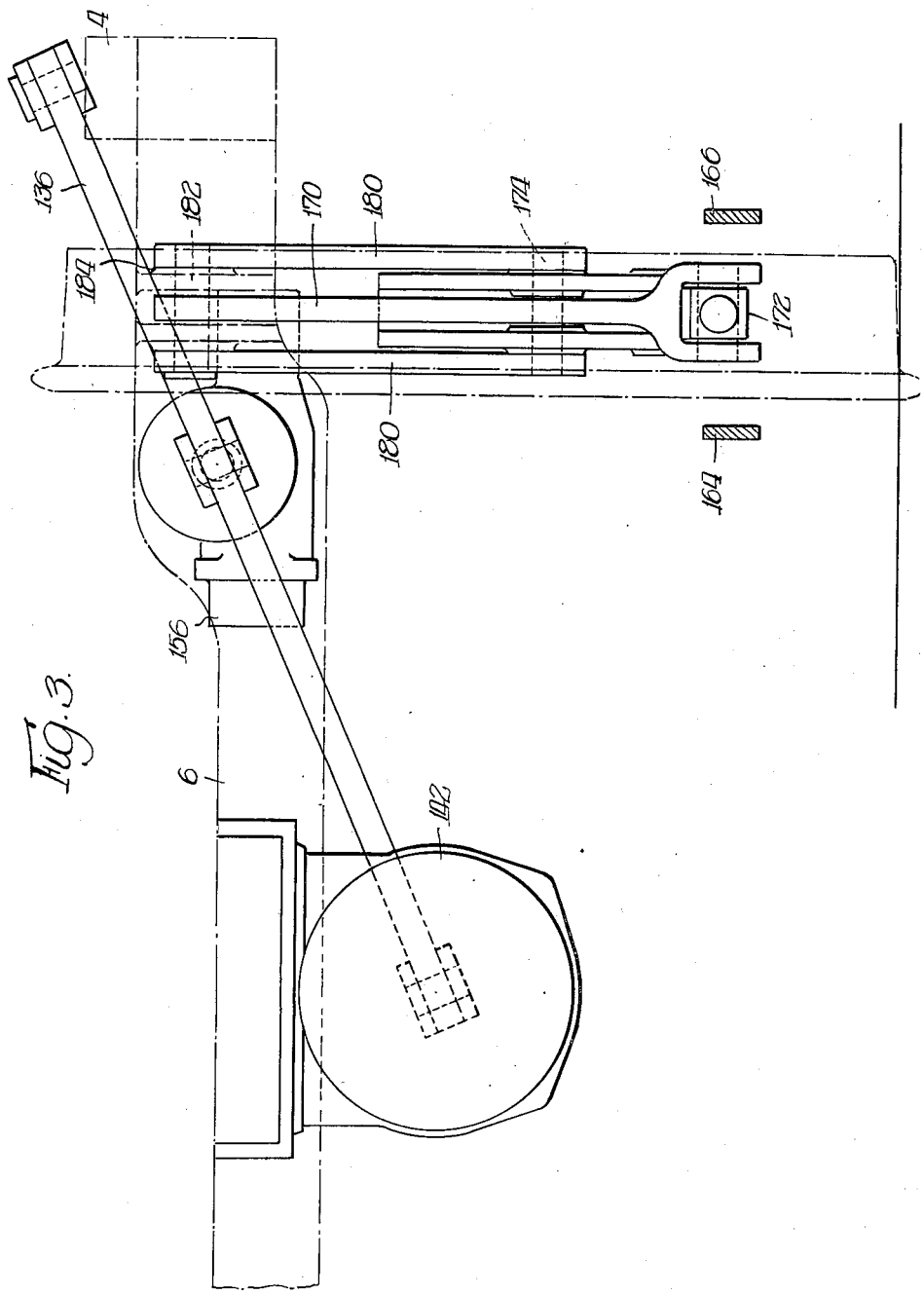

Patented June 15, 1937

2,084,071

UNITED STATES PATENT OFFICE 2,084,071

UNIT CYLINDER CLASP BRAKE

Walter H. Baselt, Chicago, Ill., assignor to American Steel Foundries, Chicago, Ill., a corporation of New Jersey Application August 31, 1936, Serial No. 98,721

22 Claims. (Cl. 188—56)

My invention relates to brakes of the clasp type wherein brake heads and brake shoes are applied to opposite sides of each car wheel.

An object of my invention is to provide a design of clasp brake particularly suitable for trucks of high-speed trains.

Another object of my invention is to provide such a type of brake rigging wherein the power means will be mounted on the truck frame.

A still further object of my invention is to provide a clasp type of brake rigging wherein the slack adjusting arrangement will be exteriorly of the truck and the other parts will be so arranged as to provide maximum clearance conditions for a car body having a low center of gravity.

Yet another object of my invention is to provide such a truck and brake arrangement as will permit power means and slack adjusting means to be conveniently located for adjustment and repair.

With these and various other objects in view, my invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a top plan view of a railway car truck embodying my invention, only one-half of the truck being shown it being understood that the rigging on opposite sides of the truck are the same and that the power means and slack adjusting means are similar on the alternate opposite ends of the truck;

Figure 2 is a side elevation of the truck and brake arrangement shown in Figure 1; and Figure 3 is a fragmentary end elevation, the view being taken from the left as seen in Figures 1 and 2.

Describing in more detail the structure shown in the drawings, the truck 2 comprising side frames 4—4 joined at their opposite ends by end rails 6—6, each side frame having adjacent each end thereof the integrally formed pedestals 8 and 10 defining the journal opening 12 and providing the usual means of connection with the journal portion (not shown) of the wheel and axle assembly 14. Adjacent the transverse center line of the truck the side frames are joined by the integrally formed transoms 16 and 18 between which may be carried the bolster (not shown) providing support for the car body in the usual manner.

The brake rigging comprises the dead truck lever 20 (Figure 2, right) and the paired hanger 21 comprising inner and outer halves 22 and 24, both lever and hanger being pivotally supported at their upper ends as at 26 from the bracket 28 integrally formed on the end rail adjacent an end thereof. Pivotally connected as at 30 at the lower end of the paired hangers 21 and at a point intermediate the ends of the dead lever 20 is hung the brake head 32 and the associated brake shoe 34, the brake head connection being retained in proper adjustment and balance as by the balance means 36. The lower end of the lever 20 is pivotally connected as at 38 to the paired strap 40 comprising the inner and outer halves 42 and 44, said connection being made adjustable by means of the manual slack adjuster 46. The opposite end of the paired strap 40 is pivotally and adjustably connected as at 48 to the lower end of the live truck lever 50, the upper end thereof projecting through the elongated slot 52 provided in the bracket 54 integrally formed with the frame at the juncture of the transom 18 and the side frame 4, said upper end of the live truck lever 50 is pivotally connected as at 56 to the clevis means 58, the opposite end of said clevis means being pivotally connected as at 60 to the inner end of the horizontal dead lever 62.

Intermediate the ends of the live truck lever 50 and at the lower end of the associated paired hanger 64 is pivotally supported as at 66 the brake head 68 and the associated brake shoe 70. The upper end of the paired hanger 64 is pivotally supported as at 72 from the bracket 74 secured to the before mentioned bracket 54 as by rivets 76—76.

The dead horizontal lever 62 is fulcrumed at a point intermediate its ends as at 78 by means of the link 80 from the bracket 82 which is secured to the side frame as by rivets 84—84, the connection between said link 80 and the bracket 82 being secured by the pin 86 permitting the link 80 a swiveling movement. Sliding support for the dead horizontal lever 62 is provided by the inner and outer brackets 88 and 90 secured to the side frame.

The outer end of the dead horizontal lever 62 is pivotally connected as at 92 to the pull rod 94, the opposite end of said pull rod having a pivotal connection as at 96 to the live horizontal lever 98, the inner end of said live horizontal lever being pivotally connected as at 100 to the clevis means 102, the opposite end of said clevis means being pivotally connected as at 104 to the upper end of the live truck lever 106. At a point intermediate the ends of the live truck lever 106 is pivotally supported as at 108 the brake head 110 and the associated brake shoe 112, said head being properly balanced by balance means 114. At the pivotal point 108 is also connected the lower end of the paired hanger 116, the upper end of said hanger being pivotally connected as at 118 to the bracket 120 secured to the bracket 122 integrally formed in the frame at the juncture of the side frame 4 and the transom 16. The upper end of the live truck lever 106 projects through the elongated slot 124 formed in the bracket 122.

The live horizontal lever 98 is slidably supported by means of the inner and outer brackets 126 and 128 secured to the side frame. At a point intermediate its ends as at 130, the live horizontal lever 98 is pivotally connected to the pull rod 132, the opposite end of the pull rod having a pivotal connection as at 134 to the outer end of the cylinder lever 136, the inner end of said cylinder lever having a pivotal connection as at 138 to the piston 140 of the power means 142, said power means being secured to the bracket 144 integrally formed on the end rail 6 as by means of rivets 146. At a point intermediate its ends as at 148 the cylinder lever 136 is pivotally connected to the jaw 150 of the fulcrum 152, the opposite end of said fulcrum extending through the opening 154 formed in the end rail 6 and being connected to the automatic slack adjuster 156, said slack adjuster being secured on the ledge 158 formed on the end rail 6.

The lower end of the live truck lever 106 is pivotally and adjustably connected as at 160 to the paired strap 162 having the inner and outer halves 164 and 166, the opposite end of said paired strap being pivotally connected as at 168 to the lower end of the dead truck lever 170, said connection being made adjustable by means of the manual slack adjuster 172. At a point intermediate the ends of the dead truck lever 170 as at 174 is pivotally secured the brake head 176 and its associated brake shoe 178 and at the said pivotal point 174 is likewise connected the lower end of the paired hangers 180 (Figure 3), the hanger and lever arrangement at this end of the truck being the same as that shown at the opposite end of the truck. The upper ends of said truck lever 170 and said hanger 180 are pivotally connected as at 182 to the bracket 184 integrally formed on the end rail 6 adjacent an end thereof.

In operation, actuation of the power means 142 causes movement of the piston 140 to the right (Figure 1), thus rotating the cylinder lever 136 in a clockwise direction about its pivotal connection 148 with the fulcrum 152 and causing the pull rod 132 to move to the left. Movement of the pull rod 132 rotates the live horizontal lever 98 in a counter-clockwise direction about the pivot 96 at its outer end and causes the live truck lever 106 to rotate in a counter-clockwise direction about the pivot 160 at its lower end until the brake shoe 112 carried by said truck lever is brought into engagement with the periphery of the adjacent wheel. Continued movement causes the live truck lever 106 to pivot in a counter-clockwise direction about the point 108, thus moving the straps 162 to the right (Figure 2) and rotating the dead truck lever 170 in a counter-clockwise direction about its point of support 182 until the brake shoe 178 supported on said dead lever is brought into engagement with the opposite periphery of said wheel.

Continued actuation of the power means causes the live horizontal lever 98 to pivot in a clockwise direction about the point 100 at its inner end thus moving the pull rod 94 to the left and causing the dead horizontal lever 62 to rotate in a clockwise direction about its fulcrum point 78 and causing the live truck lever 50 to rotate in a clockwise direction about the pivot 48 at its lower end until the brake shoe 70 supported intermediate the ends of said live truck lever is brought into engagement with the periphery of the adjacent wheel. Continued movement causes the live truck lever 50 to pivot about the point 66 intermediate its ends moving the paired strap 40 to the left (Figure 2) and causing clockwise rotation of the dead truck lever 20 about its point of support 26 until the brake shoe 24 supported intermediate the ends of said dead lever is brought into engagement with the opposite periphery of said last mentioned wheel.

Release of the power means causes movement of the parts in directions opposite those just mentioned until the brake rigging has assumed its normal inoperative position.

It will be understood of course that actuation of the power means causes the various parts to act substantially simultaneously to apply all of the brake shoes at the same time. The progressive method of operation used in the above description is used to simplify the description.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake rigging for a railway car truck the combination of a truck frame comprising end rails, wheel and axle assemblies, power means and slack adjuster means mounted on said end rail below the upper level thereof, dead truck levers supported outwardly of the wheels, live truck levers supported intermediate the wheels, straps passing below the axles and connecting said live and dead levers for each wheel, horizontal live and dead levers intermediate said wheels, a pull rod connecting the outer ends of said horizontal levers, a cylinder lever having its outer end connected to said live horizontal lever and its inner end connected to said power means, and fulcrum means extending through said end rail and secured at one end to said slack adjuster means and at its inner end to a point intermediate the ends of said cylinder lever.

2. In a railway car truck the combination of a truck frame comprising an end rail, power means mounted thereon adjacent the longitudinal center line of said truck, slack adjuster means mounted on said end rail adjacent an opening therethrough, fulcrum means secured at one end to said slack adjuster means and extending through said opening, and brake rigging comprising live and dead truck levers supported at opposite sides of each wheel, horizontal live and dead levers having their inner ends connected respectively to said live truck levers and their outer ends connected to each other, and a cylinder lever secured intermediate its ends to said fulcrum means and having its inner end connected to said power means and its outer end connected to a pull rod, the opposite end of said pull rod being connected to a point intermediate the ends of said horizontal live lever.

3. In a railway car truck the combination of a truck frame comprising an end rail, power means mounted on said end rail, slack adjuster means mounted on said end rail outwardly thereof and adjacent an opening therethrough, live and dead truck levers supported on opposite sides of each wheel and operatively connected to each other, horizontal live and dead levers supported intermediate said wheels and connected at corresponding ends to said live truck levers and at their opposite ends to each other, and a cylinder lever operatively connected at one end to said horizontal live lever and at its opposite end to said power means, said cylinder lever being fulcrumed at a point intermediate its ends from said slack adjuster.

4. In a railway car truck the combination of a truck frame comprising an end rail, power means mounted on said end rail, slack adjuster means mounted on said end rail outwardly thereof and adjacent an opening therethrough, live and dead truck levers supported on opposite sides of each wheel and operatively connected to each other, horizontal live and dead levers supported intermediate said wheels and connected at corresponding ends to said live truck levers and at their opposite ends to each other, a cylinder lever having its inner end connected to said power means and its outer end connected to said horizontal live lever, and fulcrum means connected at one end to said slack adjuster and extending through said opening for operative connection with said cylinder lever.

5. In a railway car truck the combination of a truck frame comprising an end rail, wheel and axle assemblies associated therewith, power means and slack adjuster means mounted on said end rail, live and dead truck levers supported at opposite sides of each wheel, straps pivotally and adjustably connecting the lower ends of said live and dead truck levers for each wheel, horizontal live and dead levers supported intermediate the wheels and having their inner ends connected to said live truck levers and their outer ends operatively connected to each other, and a cylinder lever fulcrumed on said slack adjuster and having its inner end connected to said power means and its outer end operatively connected to said horizontal live lever.

6. In a railway car truck comprising a truck frame having end rails and wheel and axle assemblies associated therewith, the combination of a brake rigging comprising power means and slack adjuster means mounted on each of said end rails, live and dead truck levers supported on opposite sides of each wheel, horizontal live and dead levers supported intermediate said wheels and having their outer ends connected by pull rods, and cylinder levers having their outer ends connected respectively to points intermediate the ends of said horizontal live levers, their inner ends connected respectively to said power means, and points intermediate their ends fulcrumed respectively from said slack adjuster means.

7. In a railway car truck the combination of a truck frame comprising end rails, power means mounted on an end rail outwardly thereof, slack adjuster means mounted on said end rail outwardly thereof, live and dead truck levers supported on opposite sides of each wheel and having their lower ends connected by straps passing below the axles, horizontal live and dead levers supported intermediate the wheels and having their outer ends connected by a pull rod, a cylinder lever having its inner end connected to said power means and its outer end connected to said horizontal live lever, and fulcrum means extending through said end rail and connected at its outer end to said slack adjuster and at its inner end to said cylinder lever.

8. In a brake rigging for a railway car truck the combination of a truck frame comprising an end rail with an opening therein, power means mounted on said end rail outwardly and below the upper level thereof, slack adjuster means mounted on said end rail outwardly thereof and adjacent said opening, live and dead truck levers supported on opposite sides of each wheel, straps connecting said live and dead levers for each wheel, horizontal live and dead levers supported intermediate said wheel and operatively connected to each other, a cylinder lever having its inner end connected to said power means and its outer end operatively connected to said horizontal live lever, and fulcrum means having its inner end connected to said cylinder lever and extending through said opening for connection to said slack adjuster means.

9. In a brake rigging for a railway car truck the combination of a truck frame comprising end rails, power means and slack adjuster means mounted on each of said end rails, and brake rigging comprising live and dead truck levers supported at opposite sides of each wheel, straps connecting the lower ends of said live and dead levers for each wheel, horizontal live and dead levers supported intermediate the wheels and operatively connected to each other, and cylinder levers fulcrumed respectively at points intermediate their ends from said slack adjuster means at opposite ends of said truck, said cylinder levers having their inner ends connected respectively to said power means and their outer ends operatively connected to the brake rigging for opposite sides of said truck.

10. In a railway car truck the combination of a truck frame comprising an end rail, wheel and axle assemblies associated therewith, power means mounted on said end rail adjacent the longitudinal center line of said truck, slack adjuster means mounted on said end rail outwardly thereof and adjacent an opening therethrough, fulcrum means having its outer end connected to said slack adjuster means and extending through said opening, and a cylinder lever having its inner end operatively connected to said power means and its outer end operatively connected to the brake rigging associated with one wheel of each wheel and axle assembly, said cylinder lever being operatively connected at a point intermediate its ends to said fulcrum means.

11. In a brake rigging for a railway car truck the combination of a truck frame comprising an end rail, wheel and axle assemblies, power means and slack adjuster means mounted on said end rail below the upper level thereof, dead truck levers supported outwardly of the wheels, live truck levers supported intermediate the wheels, straps passing below the axles and connecting said live and dead levers for each wheel, horizontal live and dead levers intermediate said wheels, a pull rod connecting the outer ends of said horizontal levers, and a cylinder lever having its outer end connected to said live horizontal lever and its inner end connected to said power means, said cylinder lever being fulcrumed from a point intermediate its ends to said slack adjuster means.

12. In a railway car truck the combination of a truck frame comprising end rails, wheel and axle assemblies associated therewith, power means mounted on one of said end rails, slack adjuster means mounted on said end rail adjacent an opening therethrough, a cylinder lever having its inner end connected to said power means and its outer end operatively connected to the rigging associated with one wheel of each wheel and axle assembly, and fulcrum means extending through said opening and having its outer end connected to said slack adjuster and its inner end operatively connected to said cylinder lever.

13. In a railway car truck the combination of a truck frame comprising end rails, brake rigging mounted independently on opposite sides of said truck, power means mounted on each of said end rails adjacent the longitudinal center line of said truck, slack adjuster means mounted on each of said end rails adjacent an end thereof, and cylinder levers fulcrumed at points intermediate their ends from said slack adjusters, said cylinder levers having their inner ends connected respectively to said power means and their outer ends operatively connected respectively to the rigging on opposite sides of said truck.

14. In a brake rigging for a railway car truck the combination of a truck frame comprising end rails, wheel and axle assemblies, power means mounted on an end rail for operation of the rigging associated with one wheel of each wheel and axle assembly, slack adjuster means mounted on said end rail, live and dead truck levers supported on opposite sides of each wheel, straps connecting said live and dead truck levers for each wheel, horizontal live and dead levers intermediate the wheels, a pull rod connecting the outer ends of said horizontal levers, and a cylinder lever having its outer end connected to said horizontal live lever, its inner end connected to said power means, and a point intermediate its ends fulcrumed from said slack adjuster means.

15. In a four wheel railway car truck comprising a truck frame with end rails and wheel and axle assemblies, the combination of power means mounted on each of said end rails adjacent the longitudinal center line of said truck, slack adjuster means mounted on each of said end rails, and brake rigging comprising live and dead levers on opposite sides of each wheel, horizontal live and dead levers supported intermediate said wheels and connected at their outer ends by a pull rod, and cylinder levers adjacent each of said end rails and having their inner ends connected respectively to said power means, their outer ends connected respectively to said horizontal live levers, and points intermediate their ends fulcrumed respectively from said slack adjuster means.

16. In a brake rigging for a railway car truck the combination of a truck frame comprising end rails, power means and slack adjuster means mounted on each of said end rails, and brake rigging comprising live and dead truck levers supported at opposite sides of each wheel, straps connecting the lower ends of said live and dead levers for each wheel, horizontal live and dead levers supported intermediate the wheels and operatively connected to each other, and a cylinder lever supported adjacent each end rail, said cylinder lever being fulcrumed from the slack adjuster means mounted on the adjacent end rail and providing an operative connection between the power means mounted on said end rail and the brake rigging at one side of said truck.

17. In a car truck the combination of a truck frame comprising end rails, power means mounted on each of said end rails, slack adjuster means mounted on each of said end rails outwardly of said power means, and brake rigging independently mounted on opposite sides of said truck and comprising cylinder levers fulcrumed respectively at points intermediate their ends from said slack adjusters and pivotally connected to said power means on opposite end rails, said cylinder levers having their outer ends connected respectively to the rigging at opposite sides of said truck.

18. In a railway brake rigging the combination of a truck frame comprising an end rail, power means mounted on said end rail adjacent the longitudinal center line thereof, slack adjuster means mounted on said end rail adjacent an end thereof, and a dead cylinder lever fulcrumed intermediate its ends from said slack adjuster, said cylinder lever having its inner end pivotally connected to said power means and its outer end operatively connected to brake rigging associated with one side of said truck.

19. In a car truck the combination of a truck frame comprising an end rail, power means mounted thereon adjacent the longitudinal center line of said truck, slack adjuster means mounted on said end rail adjacent an opening therethrough, and brake rigging independently mounted on one side of said truck and comprising a cylinder lever fulcrumed at a point intermediate its ends from said slack adjuster and pivotally connected at its inner end to said power means.

20. In a car truck the combination of a truck frame comprising end rails, power means and slack adjuster means mounted on each of said rails, and a cylinder lever fulcrumed from each of said slack adjuster means, said cylinder lever having an end connected to adjacent power means and its opposite end connected to brake rigging for one side of said truck.

21. In a car truck the combination of a truck frame comprising end rails, power means mounted on each of said end rails, fulcrum means mounted on each of said end rails outwardly of said power means, and brake rigging independently mounted on opposite sides of said truck and comprising cylinder levers pivoted respectively at points intermediate their ends from said fulcrums and pivotally connected to said power means on opposite end rails, said cylinder levers having their outer ends connected respectively to the rigging at opposite sides of said truck.

22. In a car truck the combination of a truck frame comprising end rails, power means and adjustable fulcrum means mounted on each of said rails, and a cylinder lever fulcrumed from each of said adjustable fulcrum means, said cylinder lever having an end connected to adjacent power means and its opposite end connected to brake rigging for one side of said truck.

WALTER H. BASELT.